3,218,146
CONTROLLING WEEDS WITH ALPHA-CHLORI-
NATED POLYCHLOROPHENYLACETIC ACID
Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed Sept. 10, 1962, Ser. No. 222,658
24 Claims. (Cl. 71—2.3)

This invention relates to compositions of matter known as ring and side-chain chlorinated phenylacetic acids.

This is a continuation-in-part of our co-pending application S.N. 797,892, filed March 9, 1959, now U.S. Patent No. 3,134,808.

The present invention resides in new substituted phenylacetic acids useful as herbicides having the structure:

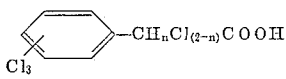

where $n$=zero or one, as well as the salts, esters, amides, anhydrides, thioamides, acid halides, thioesters, nitriles and thioanhydrides thereof. The physical embodiment of this concept has unique properties as a herbicide and chemical intermediate not logically predictable from the established properties of related compounds. Examples of such compounds are 2,4,5,α-tetrachlorophenylacetic acid; 2,4,5,α,α-pentachlorophenylacetic acid; 2,3,4,α-tetrachlorophenylacetic acid; 2,3,4,α,α-pentachlorophenylacetic acid; and 2,3,6α-tetrachlorophenylacetic acid.

The compositions of this invention may be prepared in the following manner.

Trichlorophenlyacetic acids are chlorinated in the molten state or in an organic solvent resistant to chlorination (such as carbon tetrachloride). This reaction is advantageously accelerated by ultraviolet light or by catalytic amounts of organic peroxides. Alternatively the compounds of the invention may be prepared by the chlorination of the corresponding phenylacetonitrile to introduce one or two chlorine atoms, as desired, into the α-position, followed by controlled hydrolysis of the nitrile to the acid or, if desired, to the amide or an ester of the acid by methods known to the art for hydrolysis of nitriles.

Another method of synthesis involved the direct chlorination of phenylacetic acid to simultaneously or consecutively introduce ring and side-chain chlorine. Still another process involves the reaction of the corresponding isomer of trichloromandelic acid with hydrogen chloride, thionyl chloride, or phosphorus chlorides. Using the last two reagents, the acid chlorides may be directly obtained.

The acid products used in this invention are colorless crystalline solids soluble in most organic solvents and having only slight solubility in water.

Specific instances of preparations of compounds embodied by the generic concept of this invention are given in the following examples:

Example I.—2,4,5,α-tetrachlorophenylacetic acid

Twenty-four parts by weight of 2,4,5-trichlorophenylacetic acid is warmed until fusion occurs and chlorine gas is then passed in under illumination by a 250-watt mercury vapor lamp. When the weight of the reaction mixture reached 29 grams, the mixture was recrystallized from the carbon tetrachloride, giving a colorless crystalline product, melting point 157° C. to 159° C. The neutralization equivalent by titration with NaOH to form the sodium salt was 274 (theory for $C_8H_4Cl_4O_2$, 274).

Analysis.—Calculated for $C_8H_4Cl_4O_2$, total Cl, 51.8. Found for $C_8H_4Cl_4O_2$, total Cl, 52.3. Calculated Cl hydrolyzable by alcoholic KOH, 12.9. Found Cl hydrolyzable by alcoholic KOH, 12.7.

Example II.—2,4,5,α,α-pentachlorophenylacetic acid

Chlorine gas was run into a solution of 24 parts of 2,4,5-trichlorophenylacetic acid in 300 parts of hexachlorobutadiene at 120° C. to 130° C. over a four-hour period. The solution was cooled to 20° C, then filtered and the crystals thus obtained washed with hexane. The yield was 22 parts of colorless product, melting point 164° C. to 166° C. The product after recrystallization from carbon tetrachloride melted at 168.5° C. to 169° C. Titration with 0.1 - N aqueous sodium hydroxide (giving a water-soluble sodium salt) indicated a neutralization equivalent of 307 (theory for $C_8H_3Cl_5O_2$, 308.3).

Analysis.—Calculated for $C_8H_3Cl_5O_2$, total Cl, 57.5. Found for $C_8H_3Cl_5O_2$, total Cl, 58.0. Calculated Cl hydrolyzable by alcoholic KOH, 23.0. Found Cl, hydrolyzable by alcoholic KOH, 22.9.

Example III.—2,3,6,α-tetrachlorophenylacetic acid

Chlorine gas is passed into a refluxing mixture of 60 parts of 2,3,6-trichlorophenylacetic acid and 400 parts of carbon tetrachloride under illumination by a 250-watt mercury vapor lamp. When 9 parts of hydrogen chloride have been evolved, the solvent is concentrated to about one-quarter of its former volume, cooled, and filtered. The crystalline solid thus obtained melts at 156° C. to 158° C. The neutralization equivalent by titration with NaOH to form the sodium salt was 275 (theory for $C_8H_4Cl_4O_2$, 274).

Ananlysis.—Calculated for $C_8H_4Cl_4O_2$, total Cl, 51.8. Found for $C_8H_4Cl_4O_2$, total Cl, 51.4. Calculated Cl hydrolyzable by alcoholic KOH, 12.9. Found Cl hydrolyzable by alcoholic KOH, 12.7.

Example IV.—Technical mixture of 2,3,4,α-, 2,4,5,α- and 2,3,6,α-tetrachlorophenylacetic acid A melt of 100 parts of trichlorophenylacetic acid (about 40% 2,4,5-, 40% to 50% 2,3,6- and 10% to 20% 2,3,4-isomers by infrared analysis) was chlorinated at 120° C. under irradiation by a 250-watt mercury vapor lamp. When one molar equivalent of hydrogen chloride had been evolved, the chlorination was stopped. The product was a gummy, colorless solid, observed neutralization equivalent 270, (theory for pure $C_8H_4Cl_4O_2$, 274). The analysis of the product for chlorine showed that one molar equivalent of chlorine had been introduced. Refluxing the product with an excess of potassium hydroxide in methanol for three hours hydrolyzed the product with the release of one molar equivalent of chloride ion, proving that one chloride was on the side-chain.

Example V.—Preparation of technical mixture of α,2,3,6-, α,2,4,5,- and α,2,3,4-tetrachlorophenylacetamide Chlorine gas was passed into a technical mixture of 2293 parts of trichlorophenylacetonitrile (comprised of approximately 40% to 50% 2,3,6-, 40% to 50% 2,4,5- and 10% to 20% 2,3,4-trichlorophenylacetonitrile, by infrared analysis), at 90° C. to 100° C. until 270 parts of hydrogen chloride had been evolved, requiring seven hours. The resultant product amounted to 2698 parts of α-mono chlorinated trichlorophenylacetonitrile, having the correct nitrogen and chlorine analysis for $C_8H_3Cl_4N$.

To 1160 parts of 85% sulfuric acid at 75° C. to 85° C. was added 2270 parts of this nitrile over 90 minutes with stirring. Stirring was continued for 15 minutes longer, then the mixture was poured into several volumes of water at 50° C. with stirring. The solidified amide thus obtained was filtered, washed with water, and dried to obtain a colorless solid.

*Anal.*—Calculated for $C_8H_5Cl_4N$, total Cl, 51.7; total N, 5.14. Found for $C_8H_5Cl_4N$, total Cl, 52.8; total N, 5.0.

*Example VI*

The acid product of Example IV was stirred with 10 times its weight of water and carefully neutralized by addition of one molar equivalent of dimethylamine at 20 to 25 degrees centigrade to obtain a clear aqueous solution.

Similar solutions were preferred by addition of one molar equivalent of diethanolamine and N-methylmorpholine.

*Example VII*

To a solution of one mole of 2,3,6-α-tetrachlorophenylacetic acid in benzene is added at 25 degrees centigrade a solution of one mole of triethylamine in benzene. The mixture is then evaporated to obtain triethylammonium 2,3,6,α-tetrachlorophenylacetate as a colorless water-soluble solid.

The compositions of the invention are useful as chemical intermediates. As contrasted with the chlorinated phenylacetics having only ring chlorines which are generally extremely unreactive, the compounds of this invention have reactive chlorine atoms on the side-chain which permit a great multiplicity of displacement reactions and, therefore, great utility as chemical intermediates. For example, 2,3,6,α-tetrachlorophenylacetic acid may be hydrolyzed to 2,3,6-trichloromandelic acid which has utility as a herbicide. Treatment with sodium methylate yields 2,3,6-trichloro-α-methoxyphenylacetic acid which also is a plant growth regulator. The compositions of this invention also have exceptional phytotoxic properties. In contrast to lower chlorinated phenylacetic acids which do not exert a significant killing action on plant foliage, the new compounds of the invention do exert powerful killing action on application to the foliage of plants and are, therefore, useful as outstanding rapid-acting herbicides having residual activity. This type of herbicidal activity is surprising and unexpected, since the lower chlorinated phenylacetic acids are either substantially inactive or, as in the case of 2,3,6-trichlorophenylacetic acid, act principally through the soil and by root uptake and are consequently very slow-acting herbicides. An unexpected and important advantage of the compounds of the invention is their fast rate of weed killing action.

The following example illustrates the herbicidal utility of the compositions of this invention.

*Example VIII*

In representative experiments, the products of Examples II and III were sprayed at the rate of eight pounds per acre in an aqueous emulsion (using three parts of xylene and one part of Atlox 3335, a commercial nonionic emulsifier, per one part of active ingredient) on a mixed natural population of ragweed, lambsquarters and mustard. Both compounds caused severe foliar burns and twisting within a day, resulting in the death of the plants within a week. By contrast α,α-dichlorophenylacetic acid, 2,4,5-trichlorophenylacetic acid and 2,3,4-trichlorophenylacetic acid produced substantially no effect. The sodium, dimethylammonium and triethanolammonium salts of the acids of Examples II and III above produced similar results.

*Example IX.—Use of 2,4,5,α-tetrachlorophenylacetic acid as herbicide*

An area seeded with corn, wheat, mustard, pigweed and chickweed was sprayed pre-emergence with eight pounds per acre of 2,4,5,α-tetrachlorophenylacetic acid as the sodium salt in aqueous solution. After two weeks, the corn and wheat were found to have germinated and grown normally, while the mustard, pigweed, and chickweed were completely controlled. A comparison experiment at the same rate with 2,4,5-trichlorophenylacetic acid showed substantially no weed control.

*Example X*

Plots seeded with various weed species as indicated below were sprayed prior to weed emergence with the acid, nitrile, and amide corresponding to Examples IV and V at 4 pounds per acre of each chemical. Two weeks later, when weeds had emerged and were growing vigorously in untreated companion plots, the following degrees of weed control were noted in the treated plots:

| Weed Species | Compound | | |
|---|---|---|---|
| | Acid | Amide | Nitrile |
| Quack grass | 2 | 2 | 2 |
| Foxtail | 3 | 3 | 3 |
| Crabgrass | 2 | 4 | 4 |
| Johnson grass | 2 | 3 | 3 |
| Dock | 4 | 4 | 4 |
| Mustard | 4 | 3 | 3 |
| Pigweed | 4 | 4 | 4 |
| Lambsquarters | 4 | 4 | 4 |
| Chickweed | 4 | 4 | 4 |

Rating Scale: 0=no effect; 1=slight control; 2=moderate control (25–75 percent repression of population); 3=almost complete control (75–99 percent complete repression of population); 4=complete (100 percent) control.

The compositions of the invention may be converted to salts, esters, and amides in which form they also may be used as chemical intermediates and herbicides. These compounds may also be incorporated into mixtures with other herbicides as, for example, the hormonal phenoxyaliphatic acids, sodium chlorate, sodium trichloroacetate, sodium dichloropropionate, and the N-phenyl-N'N'-dialkylurea herbicides together with formulation adjuvants of the type known to the herbicide art. A representative formulation of this sort is:

| | Parts by weight |
|---|---|
| Sodium 2,4,5,α-tetrachlorophenylacetate | 30 |
| Sodium 2,3,6,α-tetrachlorophenylacetate | 30 |
| Sodium 2,4-dichlorophenoxyacetate | 5 |
| Sodium tripolyphosphate (sequestering agent) | 20 |

The use of mixed isomers is generally preferred for economic reasons. In some cases the activity of mixtures of the compounds of the invention with each other or with other herbicides as named above appears to be greater than additive.

Any derivative of the acids described herein which can be expected to hydrolyze in the soil or in plant tissues to these acids, or which can ionize to yield the anion of these acids, is usable in the method of the invention. Thus, the salts of the said acids may be used, for instance, the alkali metal salts, such as sodium, potassium and lithium, the alkaline earth metal salts, such as magnesium and calcium, iron, lead, zinc, nickel, aluminum, ammonium, the N-substituted ammonium salts, such as methylammonium, dimethylammonium, triethylammonium, diisopropylammonium, laurylammonium, or any other mono-, di-, tri- or tetraalkylammonium salt, the N-(alkanol)-substituted ammonium salts, such as ethanolammonium, diethanolammonium, triethanolammonium, or any other alkanolammonium salt, the piperidinium, morpholinium, N-methyl morpholinium, hydrazinium, hydroxylammonium, pyridinium or diethylanilinium salts, or other salts. These salts are readily made by addition of one molar equivalent of the amine base to the acid, conveniently dispersed in water.

Also the use of the esters of these acids is included within the scope of the method of this invention, for example, the methyl, ethyl, butyl, lauryl, cyclohexyl, 2-hydroxyethyl, 2-chloroethyl, allyl, phenyl, benzyl, trichlorobenzyl, polychlorophenyl, 1,2-ethylene (bis), glyceryl (mono- bis- or tris-), methoxyethyl furfuryl, or other esters, as well as thio-analogues of these. These esters are prepared by refluxing the free acids with the alcohols, or by first reacting the acid with thionyl chloride to prepare the acid chloride, and then refluxing with the alcohol to convert the acid chloride to the ester. The thio esters can be prepared by reacting the acid chloride with a mercaptide, or by treating the ordinary ester with $P_2S_5$ in refluxing toluene.

Also, the use of the amides of these said acids is included within the scope of the method of this invention, for example, the N-unsubstituted amides of the acids of the invention. Also, the N-methyl, N,N-dimethyl, N-phenyl, N-hydroxyethyl amides, and the like, as well as the thio-analogues of these. These amides can be prepared by treating the acid chloride with ammonia or an amine. In addition, the anhydrides, and the acid chlorides, the thio anhydrides will hydrolyze to the acids and may be used. The anhydrides or the thioanhydrides are made by adding one-half mole of water or $H_2S$, respectively, to the acid chloride in the presence of two moles of a base, such as pyridine. Also, the nitrile of these acids may be used. The preparation of the nitrile of mixed acids is given in the examples.

While all of these derivatives have utility in the method of the invention, certain ones are preferred because of high activity and ease of formulation. These preferred derivatives are the free acids, the water-soluble salts, i.e., the alkali metal salts, ammonium, N-(lower alkyl)-substituted ammonium salts (having from 1 to 6 carbon atoms for alkyl group), the mono-, di-, and triethanolammonium salts, the mono-, di-, and tripropanolammonium salts, the N-methylmorpholinium salt; and also the N-unsubstituted amides.

*Example XI*

One part by weight of the product of Example 4 is refluxed for 12 hours with three parts by weight of thionyl chloride. Then aspirator vacuum is applied and the excess thionyl chloride is distilled off, leaving the α-chloro-(trichlorophenyl) acetyl chloride as a yellowish oil.

The acid chloride is dissolved in benzene and reacted with the following reagents as indicated to prepare various derivatives:

| Reagent | Quantity[1] | Conditions | Product | Characteristics |
|---|---|---|---|---|
| Methanol | Excess | Reflux 2 hrs | Methyl Ester | Oil. |
| Amyl alcohol | Excess | Reflux 2 hrs | Amyl Ester | Oil. |
| Butoxyethanol | Excess | Reflux 2 hrs | Butoxyethylester | Oil. |
| Butyl mercaptan | 1 mole | }Reflux 2 hrs | Butyl thioester | Oil. |
| Pyridine | 1 mole | | | |
| Hydrogen sulfide | 1 mole | }Room temp 10 hours | Thionahydride | Wax. |
| Pyridine | 1 mole | | | |
| Water | ½ mole | }Room temp 12 hours | Anhydride | Wax. |
| Pyridine | 1 mole | | | |
| Ethylamine | 2 moles | 5–10° C | N-ethyl amide | Oil. |
| Diethylamine | 2 moles | 5–10° C | N,N-diethylamide | Oil. |

[1] Relative to acid chloride quantity.

Each of these derivatives applied at 20 pounds per acre to soil infested with seeds of ragweed, pigweed, and lambsquarters, completely prevent the emergence and growth of these weeds.

*Example XII*

The nitrile described in Example V is dissolved in 2,6-lutidine, one molar equivalent of triethylamine is added, and $H_2S$ is passed in until the exotherm subsides. On evaporation, an amorphous solid is obtained having the correct sulfur content for the thioamide, and lacking the $C≡N$ absorption band in the infrared spectrum.

In determining whether it is advantageous to use in the field any of the aforementioned derivatives or salts of the acids of this invention rather than the acid per se, one determines the field conditions and selects the particular derivative or salt having the required characteristic to meet such conditions.

These derivatives and salts and the acid are generally effective when applied in quantities of about one-half pound per acre or more and, for ease of application, any conventional diluent such as clay, wood flour, fuller's earth, vermiculite, or liquid carrier such as xylene, kerosene, alcohols and ketones or other carrier may be used, depending on the economics and distribution requirements. Formulations may contain emulsifying agents such as sorbital laurates, wetting agents such as sodium alkyl aryl sulfonate and sodium alkyl sulfate, and carriers in accordance with the well-established practices in the herbicidal field. Combinations of this herbicide with other known herbicides or compositions for controlling the growth of vegetation and plants to obtain desirable combinations and properties are within the spirit of this invention.

The examples of the compositions of our invention, and methods of preparing and utilizing them which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:

1. A method of controlling weeds which comprises applying to the locus to be treated a composition which comprises as an active ingredient a phytotoxic amount of a composition selected from the group consisting of 2,3,4,α-tetrachlorophenylacetic acid; 2,3,6,α-tetrachlorophenylacetic acid; 2,4,5,α-tetrachlorophenylacetic acid; 2,4,5,α,α-pentachlorophenylacetic acid and mixtures of such acids; the alkali metal salts and mixtures thereof; the alkaline earth metal salts and mixtures thereof; the ammonium salts and mixtures thereof; the amides of said acids and mixtures thereof; the hydrolyzable thioamides of said acids and mixtures thereof; the hydrolyzable acid halides of said acids and mixtures thereof; the hydrolyzable nitrile of said acids and mixtures thereof; the hydrolyzable esters of said acids and mixtures thereof; the hydrolyzable anhydride of said acids and mixtures thereof; and the hydrolyzable thioanhydride of said acids and mixtures thereof.

2. The method of claim 1 wherein the active ingredient is 2,4,5,α-tetrachlorophenylacetic acid.

3. The method of claim 1 wherein the active ingredient is sodium 2,4,5,α-tetrachlorophenylacetate.

4. The method of claim 1 wherein the active ingredient is potassium 2,4,5,α-tetrachlorophenylacetate.

5. The method of claim 1 wherein the active ingredient is 2,3,4,α-tetrachlorophenylacetic acid.

6. The method of claim 1 wherein the active ingredient is 2,3,6,α-tetrachlorophenylacetic acid.

7. The method of claim 1 wherein the active ingredient is sodium 2,3,6,α-tetrachlorophenyl acetate.

8. The method of claim 1 wherein the active ingredient is potassium 2,3,6,α-tetrachlorophenylacetate.

9. The method of claim 1 wherein the active ingredient is 2,4,5,α,α-pentachlorophenylacetic acid.

10. The method of claim 1 wherein the active ingredient is sodium 2,4,5,α,α-pentachlorophenylacetate.

11. The method of claim 1 wherein the active ingredient is potassium 2,4,5,α,α-pentachlorophenylacetate.

12. The method of claim 1 wherein the active ingredient is α-chloro-trichlorophenylacetic acid.

13. The method of claim 1 wherein the active ingredient is α-chloro-trichlorophenylacetonitrile.

14. The method of claim 1 wherein the active ingredient is 2,3,6,α-tetrachlorophenylacetonitrile.

15. The method of claim 1 wherein the active ingredient is 2,4,5,α-tetrachlorophenylacetonitrile.

16. The method of claim 1 wherein the active ingredient is 2,3,4,α-tetrachlorophenylacetonitrile.

17. The method of claim 1 wherein the active ingredient is α-chloro-trichlorophenylacetamide.

18. The method of claim 1 wherein the active ingredient is 2,3,6,α-tetrachlorophenylacetamide.

19. The method of claim 1 wherein the active ingredient is 2,4,5,α-tetrachlorophenylacetamide.

20. The method of claim 1 wherein the active ingredient is 2,3,4,α-tetrachlorophenylacetamide.

21. The method of claim 1 wherein the active ingredient is the dimethylamine salt of α-chloro-trichlorophenylacetic acid.

22. The method of claim 1 wherein the active ingredient is the diethanolamine salt of α-chloro-trichlorophenylacetic acid.

23. The method of claim 1 wherein the active ingredient is the N-methylmorpholine salt of α-chloro-trichlorophenylacetic acid.

24. The method of claim 1 wherein the active ingredient is triethylammonium 2,3,6,α-tetrachlorophenylacetate.

References Cited by the Examiner

UNITED STATES PATENTS

| 2,444,905 | 7/1948 | Sexton | 71—2.6 |
| 2,977,212 | 3/1961 | Tischler | 71—2.6 |
| 3,020,146 | 2/1962 | Richter | 71—2.4 |

FOREIGN PATENTS 1,240,715  8/1960  France.

LEWIS GOTTS, Primary Examiner.

JULIAN S. LEVITT, Examiner.